US005181753A

United States Patent [19]

van Hattem et al.

[11] Patent Number: 5,181,753

[45] Date of Patent: * Jan. 26, 1993

[54] DEVICE FOR WITHDRAWING LIQUID FROM A RESERVOIR BY MEANS OF A WATER JET DEVICE

[75] Inventors: Jan C. van Hattem, Amerongen; Jan A. E. Sperna Weiland, Deventer, both of Netherlands

[73] Assignee: Sara Lee/DE N.V., Utrecht, Netherlands

[ * ] Notice: The portion of the term of this patent subsequent to May 15, 2007 has been disclaimed.

[21] Appl. No.: 508,577

[22] Filed: Apr. 13, 1990

[30] Foreign Application Priority Data

Apr. 14, 1989 [NL] Netherlands ........................ 8900942

[51] Int. Cl.[5] ........................................ F16L 41/06

[52] U.S. Cl. .................................... 285/205; 285/361; 285/396; 285/402; 137/565

[58] Field of Search ................ 417/151, 181; 137/565, 137/888; 222/395; 285/205, 402, 361, 396

[56] References Cited

U.S. PATENT DOCUMENTS 3,029,837 4/1962 Neudeck ........................ 137/888 X
3,065,883 11/1962 Nelson .
3,289,895 12/1966 Yuza .
4,476,886 10/1984 Niskanen et al. ............... 137/565 X
4,653,252 3/1987 van de Haar et al. .
4,924,908 5/1990 Weiland et al. .

FOREIGN PATENT DOCUMENTS 0236890 2/1987 European Pat. Off. .
453061 11/1927 Fed. Rep. of Germany .
622672 12/1935 Fed. Rep. of Germany .
2528806 12/1983 France .
8101992 7/1981 World Int. Prop. O. .

*Primary Examiner*—Randolph A. Reese
*Assistant Examiner*—Heather Chun
*Attorney, Agent, or Firm*—Longacre & White

[57] ABSTRACT

A device for attaching a water jet device to a concentrate container or a reservoir by means of a clamping device or a foot, comprising a connecting piece, in which the foot is arranged to be fixed and put into sealing abutment with the insert piece in one movement, for which purpose the connecting piece is provided externally with threaded parts designed to cooperate through a bayonet catch with a complementarily designed part of the foot. The container, which is designed as a flexible bag, may be provided with a base plate at the position of the connecting piece, said connecting piece being designed as an insert piece, so as to ensure that the outlet opening of the insert piece remains open.

7 Claims, 1 Drawing Sheet

DEVICE FOR WITHDRAWING LIQUID FROM A RESERVOIR BY MEANS OF A WATER JET DEVICE

BACKGROUND OF THE INVENTION

The invention relates generally to mechanical connectors and more particularly to a device having a connecting piece for attaching a water jet device to a concentrate container or reservoir by means of a clamping device or a foot.

In a similar device shown in U.S. Pat. No. 4,924,908 (which claims priority to Dutch Patent Application 8800113) an apparatus for withdrawing liquid from a reservoir by means of a water jet device in a clamping device is shown. A reservoir box is shown with a filled flexible bag incorporated inside. The flexible bag is filled at least partially with liquid. A connecting or clamping piece is used to connect the water jet device to the reservoir box and flexible bag via a top opening in the water jet device and connecting/clamping piece. The reservoir is provided with an outlet opening having a valve mechanism fitted with a lip seal. The water jet device also connects on the one end to a water supply hose and on the other end to a drain spout. The method and apparatus are characterized in that the reservoir is a flexible bag fitted with a connector or insert. When a supply of pressurized water flows through the water jet device, the normally closed lip seal of the connector is externally subjected to lower pressure and thereby flexes to an open condition which permits liquid contained in the bag to flow out through the connector and mix with the liquid flowing through the water jet device.

Before using the connecting piece, which is shown as insert piece, the connecting piece must be pulled out through an opening in the box and fixed to the box by means of collars. Because there are a plurality of collars, this leads to mistakes if the user does not pull out the insert piece far enough and consequently fixes the box incorrectly. In addition, this known device makes use of a clamping device which is slid around the insert piece and, as a consequence of not pulling out the insert piece sufficiently far enough or as a consequence of the box being less stiff, so that it may assume a concave shape on the side concerned, the clamping device is not always correctly slid around the insert piece. This creates the situation where the water jet device is not properly connected and does not operate correctly. In extreme cases, no dispensing takes place at all when the water jet device does not operate correctly.

Furthermore, in the apparatus described in Dutch Patent Application 8800113 and U.S. Pat. No. 4,924,908, mentioned above, it is possible for the clamping device to be slid around the insert piece from two sides. This too leads to mistakes in practice. Because on the one hand the clamping device should be attached to the insert piece through a horizontal sliding movement, and on the other hand the venturi should be fixed in the box by being clamped around the insert piece through a vertical rotary movement; thus, the clamping device must be designed in two parts, one incorporating a venturi element and a second upper portion for connection to a reservoir box.

SUMMARY OF THE INVENTION

The object of the invention is to remove the drawbacks mentioned above.

For this purpose, a device of the above kind is characterized in that the clamping device or foot is arranged to be fixed and put into sealing abutment with the insert piece in one movement. An additional advantage is that the foot can be designed in one part, incorporating the venturi element. Further advantages of this construction are that the foot can be manufactured at less cost, and the construction is easier to clean and easier to use.

The connecting piece may be provided externally with threaded parts designed to cooperate through a bayonet catch with the complementarily designed part of the foot.

In a further elaboration of the invention, the container, which is designed as a flexible bag, can be provided with the base plate at the position of the connecting piece, which is designed as an insert piece. The base plate made of stiff material can be bent so as to ensure that the outlet opening of the insert piece remains open. A further advantage of the bent shape is that the insert piece is within the confines of the box during transport.

In addition, to ensure that the flexible bag can be emptied properly, at least a part of the box wall receiving the insert piece may be designed to extend obliquely. Naturally, the foot may then be provided with corresponding oblique parts.

In illustrating the invention, one embodiment of the device will be described, by way of example, with reference to the accompanying drawings, in which FIG. 1 is a top plan view of the foot of the clamping device by means of which a water jet device can be attached to a concentrate container or box;

Figure 1:
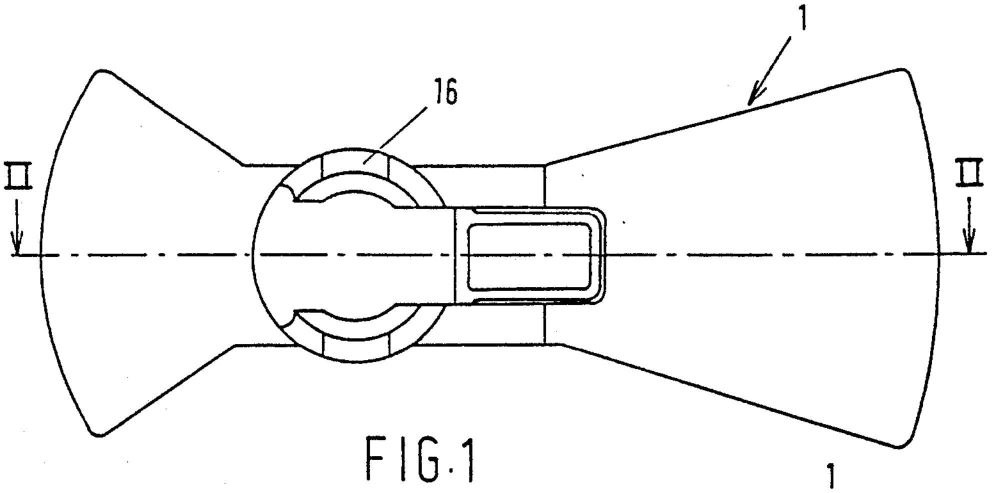
Figure 2:
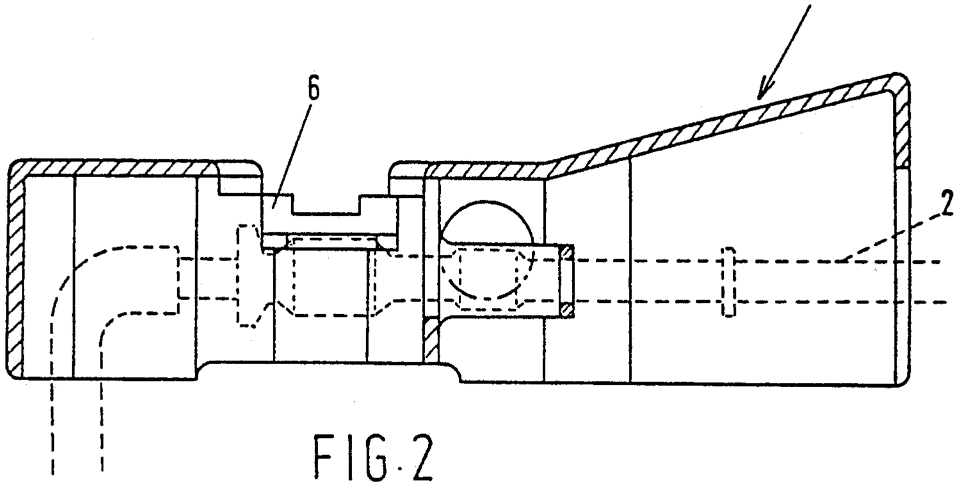
FIG. 2 is a cross-sectional view taken on line II—II of FIG. 1.
Figure 3:
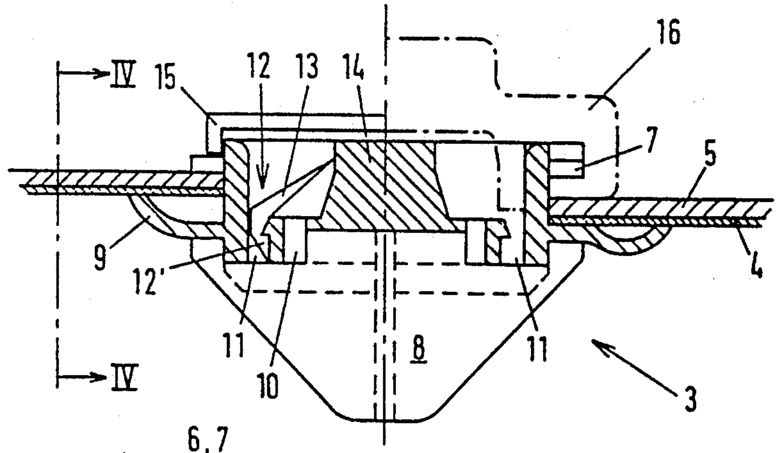
FIG. 3 is a cross-section of an insert piece mounted in a reservoir box.
Figure 4:
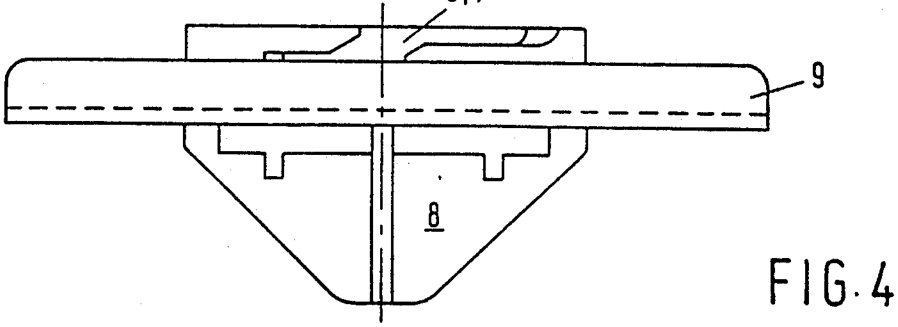
FIG. 4 is an elevational view taken on line IV—IV of FIG. 3, without the surrounding box and the flexible bag.

As shown in FIGS. 1 and 2, a device for attaching a water jet device 2, indicated schematically by dashed lines, to a clamping device or foot 1 is shown. As shown in FIG. 3, an insert piece 3 is fixedly connected to a flexible bag 4 suspended within a reservoir box 5. For further details on the flexible bag and box as well as the method of suspension, reference is made to the applicants' U.S. Pat. No. 4,653,252, which is incorporated herein by reference.

Foot 1 is provided with part 6 and finger 16. Insert piece 3 is provided with complementary threaded part 7. Complementary parts 6, 7 along with finger 16 can cooperate in the fashion of a bayonet catch when properly aligned and rotated. This way of attachment has the advantage that the foot can be fixed and put into sealing abutment with the insert piece in one single movement which connects complementary part 6 with 7 and 16. Also unlike the device shown in U.S. Pat. No. 4,924,908 in which the foot consists of two parts, one incorporating the venturi element and a second upper portion, the foot 1 of the instant invention has the advantage of having only one part incorporating the venturi element.

As is further shown by FIG. 3 in particular, the insert piece is fixedly connected to the flexible bag 4, and is in fact detachably connected to box wall 5. In FIG. 3, the left-hand part shows the insert piece before use, i.e. provided with a cover cap or lid 15, and the right-hand part shows the insert piece during use, i.e., after coupling with a schematically indicated bayonet finger 16 of foot 1.

Insert piece 3 is provided with partitions 8 to keep it open, and as is known from Dutch Patent Application 8800113 and U.S. Pat. No. 4,924,908 allows complete emptying of the flexible bag. To ensure that the bag may be emptied fully, the flange base plate 9 in FIG. 3 is bent, so as to prevent with certainty that parts of the collapsing bag block the outlet openings of the insert piece as a consequence of withdrawing liquid from the bag. In addition, a comparison of the left-hand part and the right-hand part of FIG. 3 shows that in properly attaching the foot to bag 4 and box 5 via a strong tightening of insert piece 3 with bayonet finger 16, a good seal is effected.

The insert piece 3 is provided with the partitions 8 as well as outlet openings 10. Engaging in another outlet opening 11 is the end 12' of a resilient valve 12, of which valve a part of a flange or rim 13 is bent inward and abuts resiliently with a hub 14 of insert piece 3. As is known from Dutch Patent Application 8800113 and U.S. Pat. No. 4,924,908, flange or rim 13 of the instant invention can be a normally closed lip seal which normally abuts against hub 14 thereby preventing the contents of bag 4 from flowing through outlet openings 10 of insert piece 3. However, when flange or rim 13 is externally subjected to lowered pressure, flange or rim 13 flexes to an open condition thereby permitting the contents of bag 4 to flow through insert piece 3 via openings 10. As is also known from Dutch Patent Application 8800113 and U.S. Pat. No. 4,924,908, when a supply of pressurized water flows through the water jet device 2, a lowered pressure is exerted on insert piece 3 when piece 3 is properly connected to foot 1. Thus, when pressurized water flows through water jet device 2 creating a lowered pressure on piece 3 (including flange or rim 13) the contents of bag 4 flows through insert piece 3 and mixes with the pressurized water in the water jet device 2.

As is best shown by FIG. 2, the upper part of foot 1 may be designed to extend obliquely, so as to ensure a good emptying of the superjacent flexible bag (not shown in FIG. 2). In a similar way container wall 5 will in this case also be designed to extend obliquely.

It will be clear that modifications and additions are possible without departing from the scope of the invention.

What we claim is:

1. An apparatus for withdrawing liquid from a reservoir, comprising:

a reservoir box having a bottom wall provided with an opening;

a flexible bag for containing a supply of liquid to be withdrawn from said flexible bag through said opening, said flexible bag being supported in said reservoir box;

a connector extending as an outlet opening means from within said flexible bag near said bottom wall, down and out of said flexible bag through said opening;

said connector being fitted with a valve mechanism including a normally closed lip seal which, while externally subjected to lowered pressure flexes to an open condition which permits liquid contained in the bag to flow out through the connector; and a water jet assembly comprising:

a water jet device arranged to be connected at an inlet end thereof to a supply of pressurized water and to be connected at an outlet end therefor to a drain for water mixed with liquid withdrawn from said flexible bag by operation of said water jet device, said water jet device including a socket through which water is jetted, in use, for creating a lowered pressure on said lip seal, said lip seal arranged to be communicated by said socket, in use, to water jetted through said socket; and a clamping device at least partially housing said water jet assembly, characterized in that the clamping device is arranged to be fixed and put into sealing abutment with said connector in one movement.

2. An apparatus according to claim 1 wherein said connector is provided with external threads designed to cooperate through a bayonet catch with said clamping device having complementary threaded portions.

3. An apparatus of claim 1 wherein at least a part of said box wall receiving the insert piece extends obliquely.

4. An apparatus according to claim 3 wherein the clamping device is provided with corresponding oblique parts.

5. An apparatus according to claim 2 wherein said connector is an insert piece.

6. In apparatus according to claim 5 wherein said flexible bag further includes a base plate at the location of said insert piece.

7. An apparatus according to claim 6 wherein said base plate is bent so as to insure that the outlet opening of the insert piece remains open.

* * * * *